(12) United States Patent
Kukreja et al.

(10) Patent No.: US 12,072,855 B2
(45) Date of Patent: Aug. 27, 2024

(54) METHODS, SYSTEMS, AND COMPUTER READABLE MEDIA FOR UTILIZING MACHINE LEARNING FOR MERGING DUPLICATE DATA RECORDS

(71) Applicant: Precisely Software Incorporated, Burlington, MA (US)

(72) Inventors: Manish Kukreja, Haryana (IN); Parag Mittal, Uttar Pradesh (IN); Himanshu Kapoor, Uttar Pradesh (IN); Himanshu Verma, Up (IN); Mani Rana, New Delhi (IN)

(73) Assignee: PRECISELY SOFTWARE INCORPORATED, Burlington, MA (US)

( * ) Notice: Subject to any disclaimer, the term of this patent is extended or adjusted under 35 U.S.C. 154(b) by 72 days.

(21) Appl. No.: 17/590,118

(22) Filed: Feb. 1, 2022

(65) Prior Publication Data

US 2023/0169052 A1    Jun. 1, 2023

(30) Foreign Application Priority Data

Dec. 1, 2021    (IN) ............................. 202141055684

(51) Int. Cl.
    *G06F 16/215*    (2019.01)

(52) U.S. Cl.
    CPC ............................. *G06F 16/215* (2019.01)

(58) Field of Classification Search
    CPC ............................................. G06F 16/215
    See application file for complete search history.

(56) References Cited

U.S. PATENT DOCUMENTS

| 6,912,549 | B2 * | 6/2005 | Rotter | G16Z 99/00 |
| 11,561,766 | B2 * | 1/2023 | Mueller | G06F 16/215 |
| 2016/0357790 | A1 * | 12/2016 | Elkington | G06N 20/00 |
| 2019/0361851 | A1 * | 11/2019 | Rogynskyy | G06F 16/906 |

* cited by examiner

*Primary Examiner* — Maher N Algibhah
(74) *Attorney, Agent, or Firm* — IKDW FIRM PLLC (57) ABSTRACT

Methods, systems, and computer readable media for utilizing machine learning for merging duplicate data records are disclosed. One method includes receiving duplicate data records, constructing collection level feature attributes from the duplicate data records, and extracting one or more samples from the collection level feature attributes. The method further includes receiving domain expert stimulus input corresponding to the one or more samples, training a merging machine learning model using the stimulus input, and utilizing the merging machine learning model to generate a master data record corresponding to the duplicate data records or a rule to derive the master data record.

17 Claims, 11 Drawing Sheets

| FirstName | Source |
|---|---|
| John | Government |
| Jonny | Accounting |
| John | NetSuite |
| Jonathon | Social |
| Michael | Accounting |
| Mike | Social |
| Michael | Government |

610

| FirstName | Source | Source_Government | Source_Accounting | Source_Netsuite | Source_Social |
|---|---|---|---|---|---|
| John | Government | 1 | 0 | 0 | 0 |
| Jonny | Accounting | 0 | 1 | 0 | 0 |
| John | NetSuite | 0 | 0 | 1 | 0 |
| Jonathon | Social | 0 | 0 | 0 | 1 |
| Michael | Accounting | 0 | 1 | 0 | 0 |
| Mike | Social | 0 | 0 | 0 | 1 |
| Michael | Government | 1 | 0 | 0 | 0 |

METHODS, SYSTEMS, AND COMPUTER READABLE MEDIA FOR UTILIZING MACHINE LEARNING FOR MERGING DUPLICATE DATA RECORDS

PRIORITY CLAIM

This application claims the benefit of Indian Provisional Patent Application Serial No. 202141055684, filed Dec. 1, 2021, the disclosure of which is incorporated herein by reference in its entirety.

TECHNICAL FIELD

The subject matter described herein relates to machine learning models for managing database records. More particularly, the subject matter described herein relates to methods, systems, and computer readable media for utilizing machine learning for merging duplicate data records.

BACKGROUND

Consolidation and/or merging involves the process of combining a set of duplicate data records that represents the same entity or person in order to produce a single golden data record (e.g., a single 'best of breed' or most reliable data record). The consolidation process is one of the final steps conducted in enterprise data management and usually comprises application of a series of automatic rules and manual decisions that collectively attempt to produce a golden record for each business entity or person from multiple data sources. Notably, enterprises can have multiple data record versions (or states) originating from multiple sources for the same business entity and people may be included in data records using, for example, multiple versions of a first name represented as a formal full, given name and a shortened nickname. The primary goal when conducting a record consolidation is to initially identify all versions and/or duplicate records for a given business entity or person object (e.g., a customer/organization/address object record entry) and subsequently combine these duplicate records to produce a golden data record (i.e., a most reliable record or 'single version of truth'). The veracity of the resultant record can be designated by a confidence score and/or trust level. Such a confidence score can be based on multiple factors related to the data record, such as the quality of the source of data, chronology/recency of the record, update frequency, completeness, validity, and the like.

Traditional data record merging solutions typically involve a combination of manual consolidation and automated rule-based consolidation processes. Accordingly, there exists a need for improved methods and systems for utilizing machine learning for merging duplicate data records.

SUMMARY

Methods, systems, and computer readable media for utilizing machine learning for merging duplicate records are disclosed. One method includes receiving a plurality of duplicate data records, constructing a plurality of collection level feature attributes from the duplicate data records, and extracting one or more samples from the plurality of collection level feature attributes. The method further includes receiving domain expert stimulus input corresponding to the one or more samples, training a merging machine learning model using the stimulus input, and utilizing the merging machine learning model to generate a master data record corresponding to the duplicate data records or a rule to derive the master data record.

According to another aspect of the method described herein, the plurality of duplicate data records is formed by an internal or external data record matching process.

According to another aspect of the method described herein, the constructing of the plurality of collection level feature attributes includes generating record level features for the plurality of duplicate data records and converting the record level features into collection level features.

According to another aspect of the method described herein, the record level feature attributes include one or more of a frequency feature attribute, length feature attribute, chronology feature attribute, source feature attribute, and completeness feature attribute.

According to another aspect of the method described herein, the plurality of collection level feature attributes include at least one or more of most common feature attribute, longest feature attribute, shortest feature attribute, and most recent feature attribute.

According to another aspect of the method described herein, the one or more samples represents a majority of divergent patterns or variations that is exhibited by the duplicate data records.

According to another aspect of the method described herein, domain expert stimulus input comprises label designations of feature attributes indicated in the one or more samples.

In another embodiment, a system for utilizing machine learning for merging duplicate data records includes at least one processor, a memory element, and a data record consolidation (DRC) manager stored in the memory element and when executed by the at least one processor is configured for receiving a plurality of duplicate data records, constructing a plurality of collection level feature attributes from the duplicate data records, extracting one or more samples from the plurality of collection level feature attributes, and receiving domain expert stimulus input corresponding to the one or more samples. The system further includes a merging machine learning (MML) model stored in the memory element and when executed by the at least one processor is configured for utilizing the merging machine learning model to generate a master data record corresponding to the duplicate data records or a rule to derive the master data record, wherein the merging machine learning model is trained by the DRC manager using the stimulus input.

According to another aspect of the system described herein, the plurality of duplicate data records is formed by an internal or external data record matching process.

According to another aspect of the system described herein, the DRC manager is further configured for generating record level features for the plurality of duplicate data records and converting the record level features into collection level features.

According to another aspect of the system described herein, the record level feature attributes include one or more of a frequency feature attribute, length feature attribute, chronology feature attribute, source feature attribute, and completeness feature attribute.

According to another aspect of the system described herein, the plurality of collection level feature attributes include at least one or more of most common feature attribute, longest feature attribute, shortest feature attribute, and most recent feature attribute.

According to another aspect of the system described herein, the one or more samples represents a majority of divergent patterns or variations that is exhibited by the duplicate data records.

According to another aspect of the system described herein, domain expert stimulus input comprises label designations of feature attributes indicated in the one or more samples.

The subject matter described herein may be implemented in hardware, software, firmware, or any combination thereof. As such, the terms "function" "engine" or "manager" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. In some embodiments, such a computer readable medium can be executed by one or more on-premises computing devices or by one or more cloud computing based systems (e.g., Software as a Service (SaaS) implementations).

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for utilizing machine learning for merging duplicate data records. In particular, the disclosed subject matter includes an improved machine learning based solution for combining groups of duplicate database records and ultimately producing an associated master data record (or golden record). Traditional data record merging solutions typically involve a combination of manual consolidation and automated rule-based consolidation processes. For example, established approaches using manual consolidation techniques require business administrators with domain expertise to spend a significant amount of time deriving a master data record that is representative of a 'single version of truth'. In particular, the manual tasks involved with this approach are repetitive and tedious for administrators since the records obtained from data sources exhibit similar patterns. Likewise, techniques that utilize automated rules to generate a master data record from multiple states and/or sources also have their deficiencies. Namely, these types of approaches are still dependent on specific data sources that are associated with observable patterns or rules that are largely restricted to the actual source from which the data records are acquired. As such, arriving at a given set of rules for a set of data sources can be an arduous task and requires considerable data analysis because the addition of any new source (or modification to the existing sources) requires significant retrofitting and retroversion efforts.

Data record consolidation processes primarily rely on business requirements and patterns that exist in the source data. Further, data input from domain experts that can be used for training machine learning models is typically employed (i.e., supervised learning). Since the entire data source (e.g., millions of data records) utilized for consolidation cannot feasibly be manually tagged by business administrators, alternative solutions are necessary. Accordingly, the disclosed system is configured to extract one or more sample subsets that includes representative data records associated with the most prominent patterns from the data provided by the input source (e.g., unsupervised learning). To make the consolidation process time more effective and resilient, the disclosed system is configured to apply a combination of unsupervised and supervised machine learning approaches. Notably, the disclosed system uses a data record manager (DRM) process (described in greater detail below) that can be used to train a machine learning model from domain expert stimulus data comprising domain expert actions aimed toward resolving and merging duplicate records. As used herein, a machine learning model can comprise one or more of a machine learning algorithm, process, function, and/or the like. In some embodiments, the disclosed DRM process is configured to build feature vectors at the 'record level' (e.g., record level feature attributes) and subsequently convert those feature vectors into 'group level' features (e.g., collection level feature attributes). Once trained using data from the collection level feature attributes and domain expert stimulus input, the DRM process can train a machine learning model that can either i) generate a master data record (e.g., a 'golden record') based on the group of duplicate records or ii) generate at least one rule from which a master data record can be derived.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
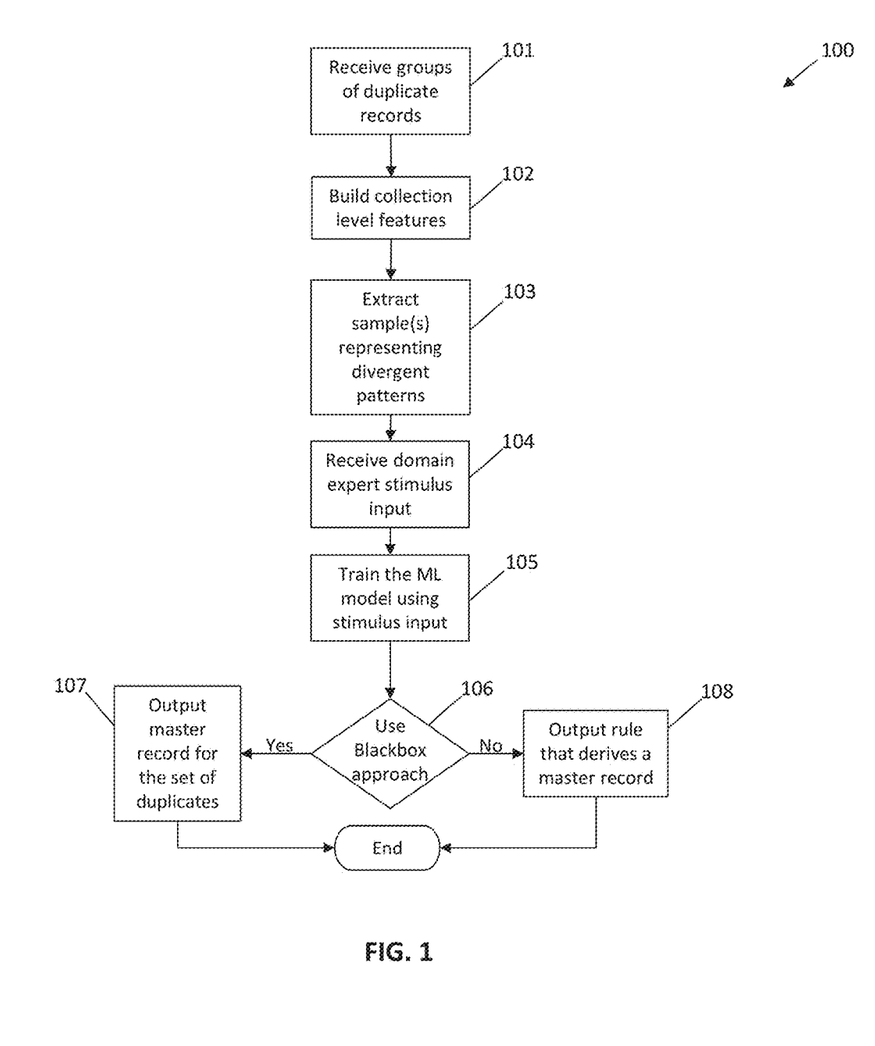
FIG. 1 is a block diagram illustrating a flow chart for resolving duplicate data records according to an embodiment of the subject matter described herein.

FIG. 1 is a block diagram illustrating a flow chart of an exemplary method 100 for utilizing machine learning for merging duplicate records. In some embodiments, method 100 can comprise an algorithm or software process (e.g., a data record consolidation (DRC) manager) that is stored in memory and executed by one or more processors of a computing platform (e.g., see computing platform and DRC manager in FIG. 10 and described below).

Referring to FIG. 1, step 101 comprises a plurality of duplicate data records received as input. As used herein, duplicate data records include two or more data records related to a single entity (e.g., a business entity or person) that are an exact match or a substantial match with each other. In some embodiments, the input data records can include duplicate data records that are generated from the output of a matching process or processing tool, which in turn provides the duplicate data record groups to a DRC manager hosted on a computing platform. Moreover, the matching process should be able to be performed using any known record matching operation tool that is adapted for identifying and grouping duplicate data records.

Figure 2:
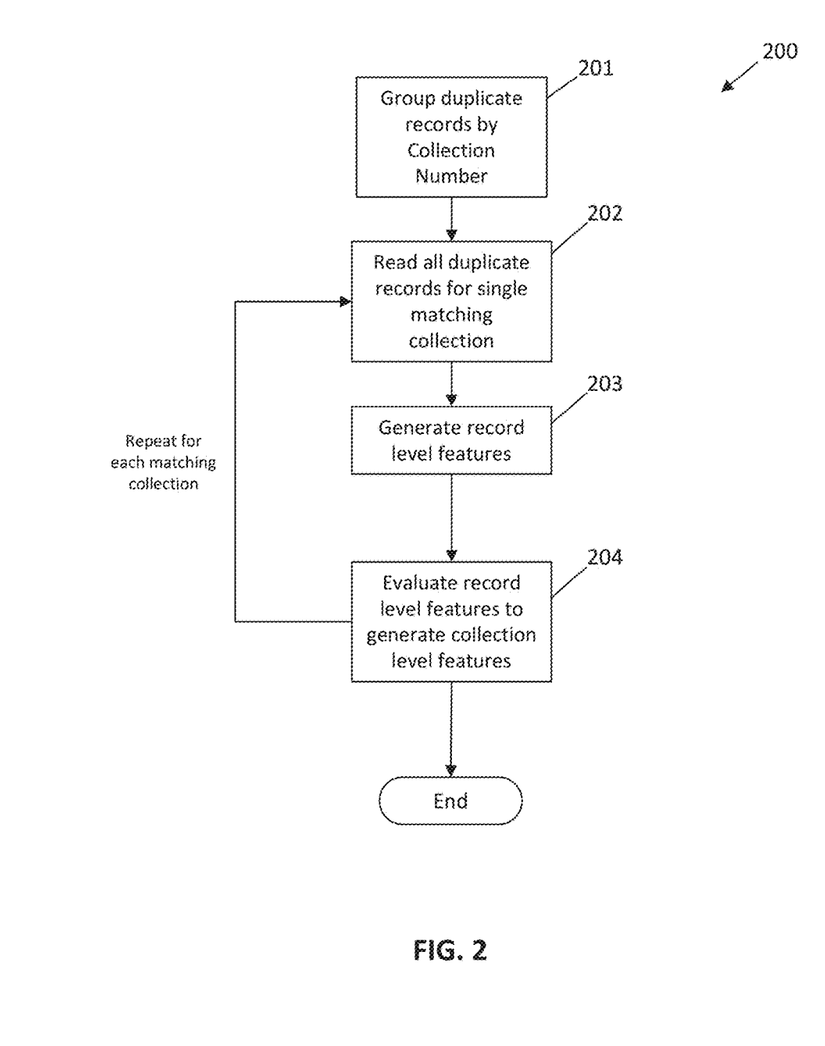
FIG. 2 is a block diagram illustrating a flow chart of an exemplary method for converting record level feature attributes to the collection level according to an embodiment of the subject matter described herein.

In step 102, collection level feature attributes for the groups of duplicate data records are generated. In particular, step 102 includes the creation of collection features at the collection level (e.g., collection level feature attributes) from the feature attributes that are initially present at the record level of the duplicate data records. As used herein, the record level refers to the abstract layer and/or level that presents feature attribute values within an individual data record. Similarly, the collection level refers to the abstract layer and/or level in which feature attribute values are presented in a consolidated or merged data record (i.e., a data record that is converted from a plurality of individual data records). In some embodiments, the system (e.g., a computing platform executing a DRC manager) can be configured to convert a group of duplicate data records or merge a group of duplicate data records to produce a single entity containing collection level feature attributes. Notably, step 102 pertains to the merging or consolidation of data records, which can be performed by the disclosed subject matter via the creation or identification of collection level feature attributes. In some embodiments, step 102 can be further segmented into sub-steps. For example, step 102 can be further illustrated using the steps method 200, which is depicted in FIG. 2 and describes an exemplary process for converting record level features to the collection level (within a group of duplicate data records).

In some embodiments, collection level feature attributes present at the collection level can be broadly classified into two categories: i) collection feature attributes that are present within the collection group and ii) collection feature attributes that are common across a group of duplicate data records.

For example, the first category of collection level feature attributes (i.e., "features within the collection") includes the features that are most predominantly found during the merging of duplicate data records and that operate at the collection level. Examples of these collection level feature attributes operating at the collection level include the consolidated record entity attributes that i) are the most common, ii) are the most former or latter, iii) have the highest or lowest attribute values, iv) have the longest or shortest attribute values, and v) have the most complete attribute values (e.g., feature attributes with the most non-blank attribute values).

Actual entity attributes that are frequently used under this first category of collection level feature attributes include names, email addresses, phone numbers, addresses, and other similar personnel-specific related information (e.g., employee status, employee title, employee identifier number, employee department, and the like). In particular, these entity attributes are sets of feature attribute values that are specific to a single entity and cannot be generalized across multiple entities. For instance, examples of these entity attributes include the selection of a data record or a given attribute value (e.g., 'FirstName') that is associated with a 'highest confidence score' within a particular set of duplicate data records, the selection of the most common email address from a given set of duplicate data records, and/or the selection of the most recently registered phone number from a particular set of duplicate data records.

The second category of collection level features (i.e., "features common across groups of duplicate records") in the collection level include categorical features that can be generalized across multiple entities and are not necessarily specific to a given individual entity. Examples of these categorical feature attributes include, but are not limited to, 'empty/not empty', 'equals/not equals/contains', 'greater than/less than', and the like. In particular, entity attributes (as described above) are generally mapped to feature categories including, but not limited to, 'source', 'domain name for email address', 'salary', and the like.

Figure 3:
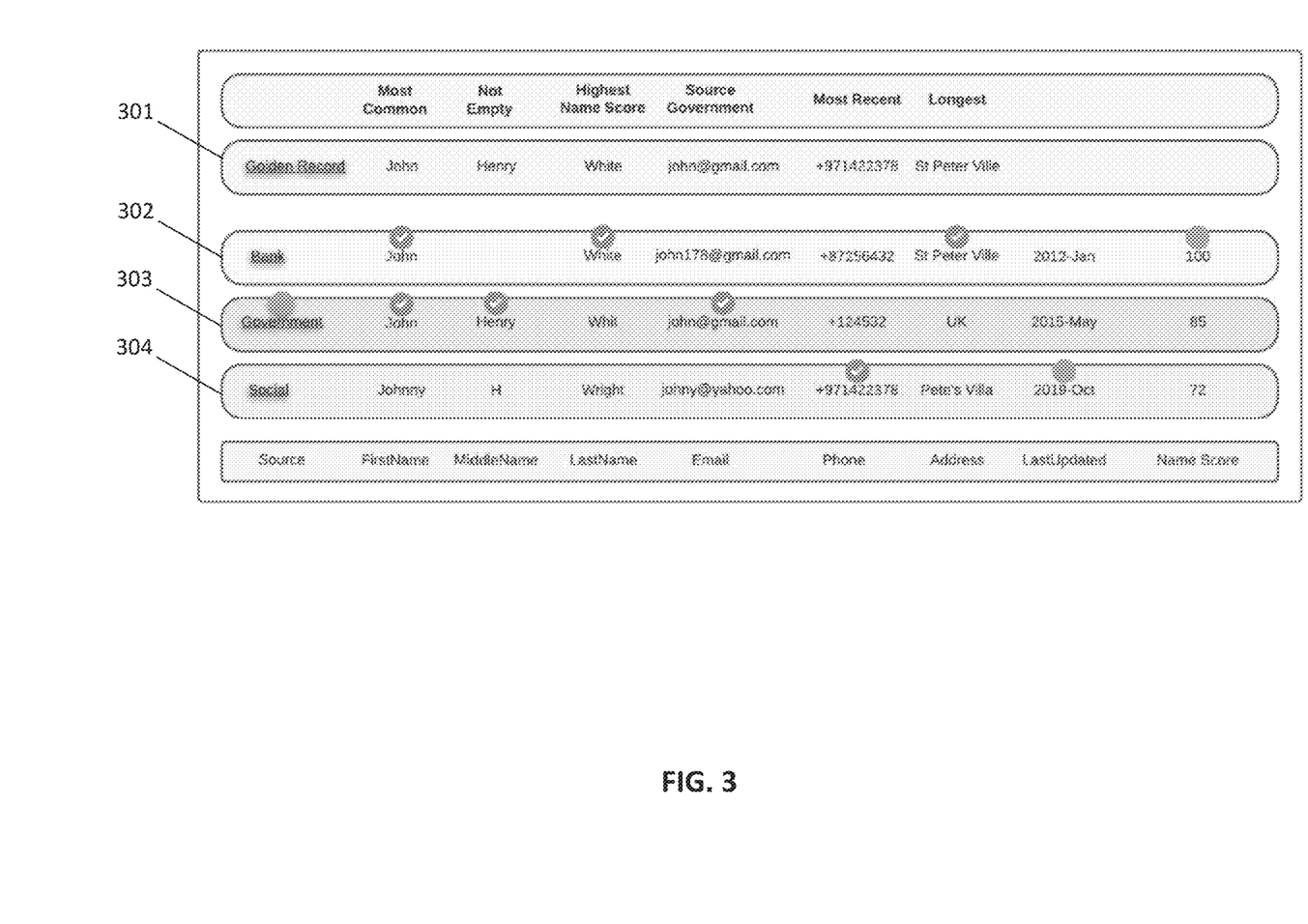
FIG. 3 illustrates an exemplary master data record according to an embodiment of the subject matter described herein.

By way of illustration and example, entity attributes are depicted in the record table 300 of FIG. 3 and may include i) the selection of an email address from the data record where the source of the data record is 'government', ii) the selection of the phone number from a data record that is most recently created (i.e., recently registered, entered, updated, etc.), and/or the selection of the names from the data record where the 'Name Score' is the highest value. In particular, FIG. 3 illustrates a master data record 301 (e.g., a 'golden record') that comprises attribute entries obtained from source data records 302-304. Specifically, the email address of master data record 301 is obtained from government record 303, the phone number of master data record 301 comes from the most recently created social record 304, and the name of master data record 301 comes from bank record 302, which includes the highest name score (equal to '100'). In some embodiments, the customer and/or a domain expert can provide the indicated selections represented by the 'checkmarks'.

As previously mentioned, one exemplary method for converting record level features to the collection level of step 102 in FIG. 1 is illustrated in additional detail as method 200 in FIG. 2. In step 201, duplicate data records are grouped together by a collection number (or other similar reference number indicative of a group). Instead of reading a single data record at a time, the system (e.g., a DRC manager hosted by a computing platform) is configured to process a matching collection group of data records as a single entity. As an example of such processing, table 400 in FIG. 4 includes a plurality of data records that are organized in a plurality of collection groups (e.g., collection group 401 and collection group 402) that exist on the record level. For example, record entries of collection group 401 can be designated by the collection number '1' as indicated in column 411. Likewise, entries of collection group 402 can be designated by the collection number '2' also indicated in FIG. 4.

In step 202, the system reads all the duplicate data records as a single matching collection group. For example, the system can be configured to identify and parse all the data record entries associated with the same matching collection number, e.g., collection group 401 in FIG. 1.

Figure 4:
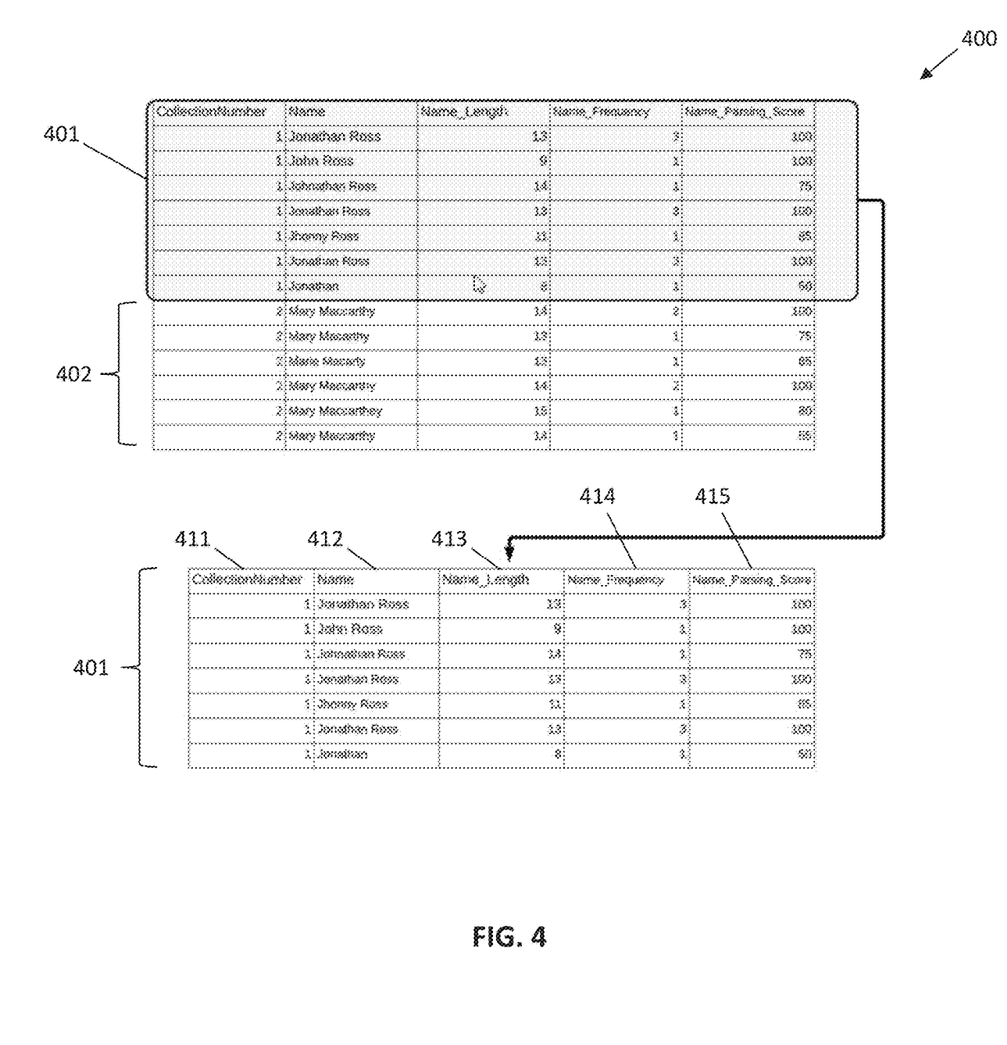
FIG. 4 illustrates an exemplary collection group according to an embodiment of the subject matter described herein.

In step 203, the system is configured to generate record level features. In some embodiments, for each collection level feature attribute column (e.g., columns 412-415), the system obtains a list of all values from the current collection group 401 and generates record level features based on semantic type, such as Name Length (e.g., column 413) and Name Frequency (e.g., column 414), Name parsing score (e.g., column 415), and the like.

In step 204 of FIG. 2, the system is configured to evaluate the record level feature attributes that are present at the collection level in order to obtain the collection level feature attributes. For example, a feature column like Name Length column 413 in FIG. 4 can be evaluated by the system for 'Longest, Shortest' values within the matching collection group (e.g., collection group 401). For example, the system can evaluate the list presented in each of columns 412-415 of collection group 401 on a separate basis in order to obtain collection level feature attributes. For a feature attribute column, like Name Parsing Score column 415 on the record level, the listed feature attribute values can be evaluated for specific collection level features at the collection level (see example below), such as highest, lowest, greater than/equal to, less than/equal to, and/or the like.

Figure 5:
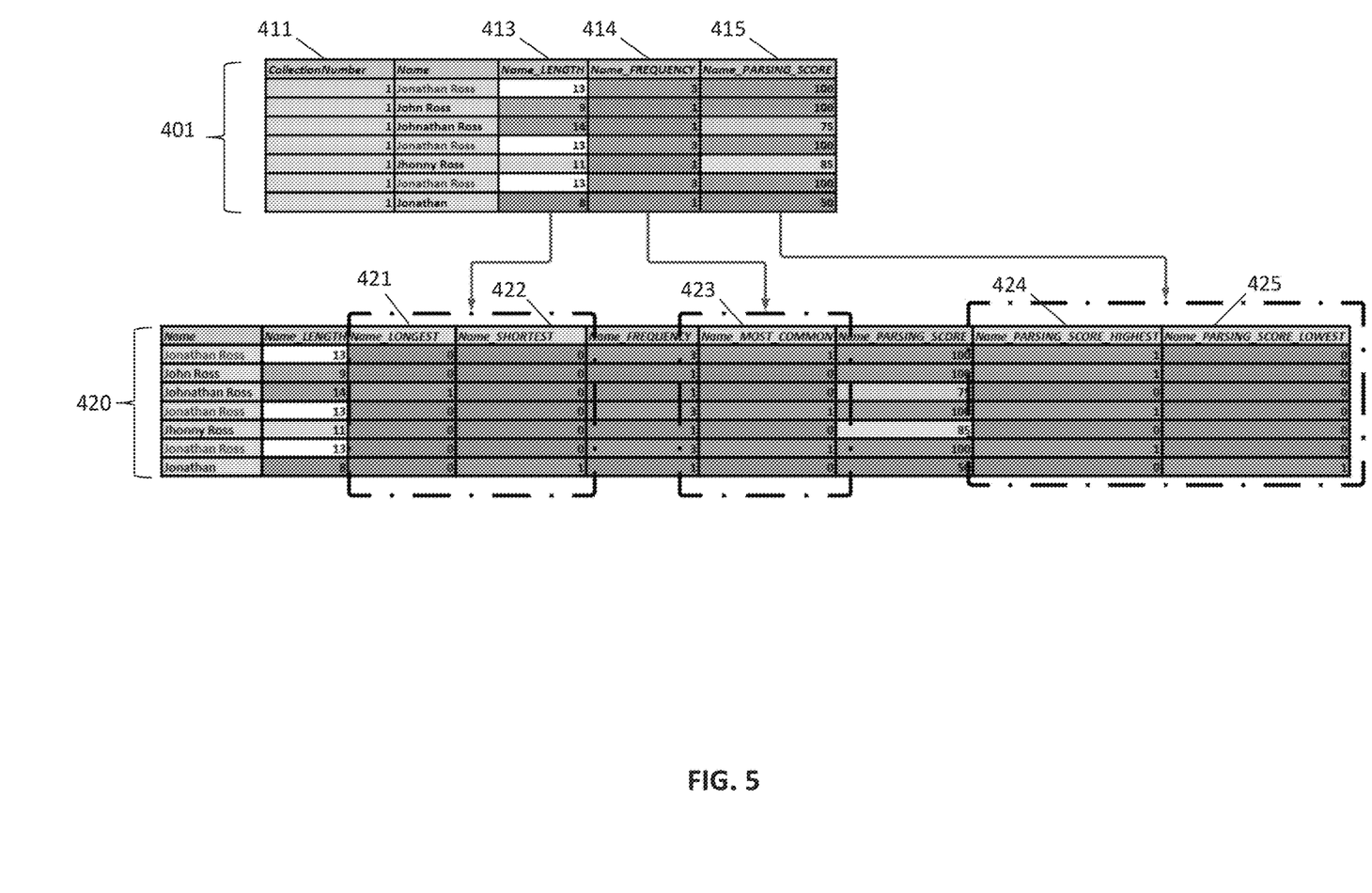
FIG. 5 illustrates exemplary record tables existing at the record level and collection level according to an embodiment of the subject matter described herein.

For example, FIG. 5 depicts a 'converted' collection group 420 that has been modified and/or converted from collection group 401. Notably, the system is configured to convert record level feature attributes presented in collection group 401 (at the record level) to feature attributes of collection group 420 that exist at the collection level. More specifically, converted collection group 420 has been modified by the system to include additional feature attributes, i.e., collection level feature attributes 421-425. In particular, FIG. 5 illustrates a Name_Longest collection level feature attribute 421, a Name_Shortest collection level feature attribute 422, a Name_Most_Common collection level feature attribute 423, a Name_Parsing_Score_Highest collection level feature attribute 424, and a Name_Parsing_Score_Lowest collection level feature attribute 425. The system is configured to analyze one or more of the record level feature attributes 413-415 in collection group 401 in order to assign feature attribute values to collection level features 421-425. For example, the system may assess record level feature column 413 and identify the longest name for the entity in the collection group is "Johnathan Ross" and has been assigned a feature attribute value of '14' at the record level. Accordingly, the system is configured to subsequently assign a feature attribute value of '1' to the "Johnathan Ross" record at the collection level (e.g., in column 421), thereby signifying that name has the longest name in the collection group. Similarly, the system may assess record level feature column 413 and identify the shortest name for the entity in the collection group is "Jonathan" and has been assigned a feature attribute value of '8' at the record level. Accordingly, the system is configured to subsequently assign a feature attribute value of '1' to the "Jonathan" record at the collection level (e.g., in column 422), thereby signifying that name has the shortest name in the collection group.

Similar processing can be conducted for the Name_Frequency feature column 414 in collection group 401. Notably, the system can assess record level feature column 414 and identify the name with the most frequent occurrences for the entity in the collection group is "Jonathan Ross" and has been assigned a feature attribute value of '3' at the record level (i.e., representing 3 instances of the name). Moreover, the system is then configured to subsequently assign a feature attribute value of '1' to each of the three "Jonathan Ross" records at the collection level (e.g., in column 423), thereby signifying that name was the most frequent name in the collection group.

Lastly, similar processing can be conducted for the Name_Parsing_Score feature column 415 in collection group 401. Namely, the system may assess record level feature column 415 and identify the parsing score for each of the records in collection group 401. The parsing score ranges from 0 to 100 at the record level. Accordingly, the system is configured to assess the record name(s) with highest parsing score and the lowest parsing score. For example, the system can assign a feature attribute value of '1' at the collection level (e.g., in column 424) to the records that were designated (at the record level) with a parsing score of '100', thereby signifying that names "Jonathan Ross" and "John Ross" have the highest parsing score in the collection group. Likewise, the system is configured to assign a feature attribute value of '1' at the collection level (e.g., in column 425) to the records that were designated (at the record level) with the lowest recorded parsing score of '50', thereby signifying that the name "Jonathan" has the lowest parsing score in the collection group. After step 204 is executed, the method 200 may loop back to step 202 in order to repeat steps 202-204 for each matching collection group (e.g., collection group '2').

In some embodiments, the system can be configured for building features for categorical values across collection groups. Categorical values like 'Source of record', 'Confidence score', and Domain name for email identifiers' that are shared across collection groups can be processed in a global manner, i.e., all of the data records at the record level (and not at the collection level). However, there are a few considerations that need to be accounted by the system before a feature attribute can be labeled or designated as categorical. For example, cardinality (e.g., distinct values) for the attribute values present in the feature attribute columns must be restricted within a threshold limit, otherwise a feature attributes set characterized by extremely high dimensions can result, thereby presenting unwanted performance issues for the system.

Figure 6:
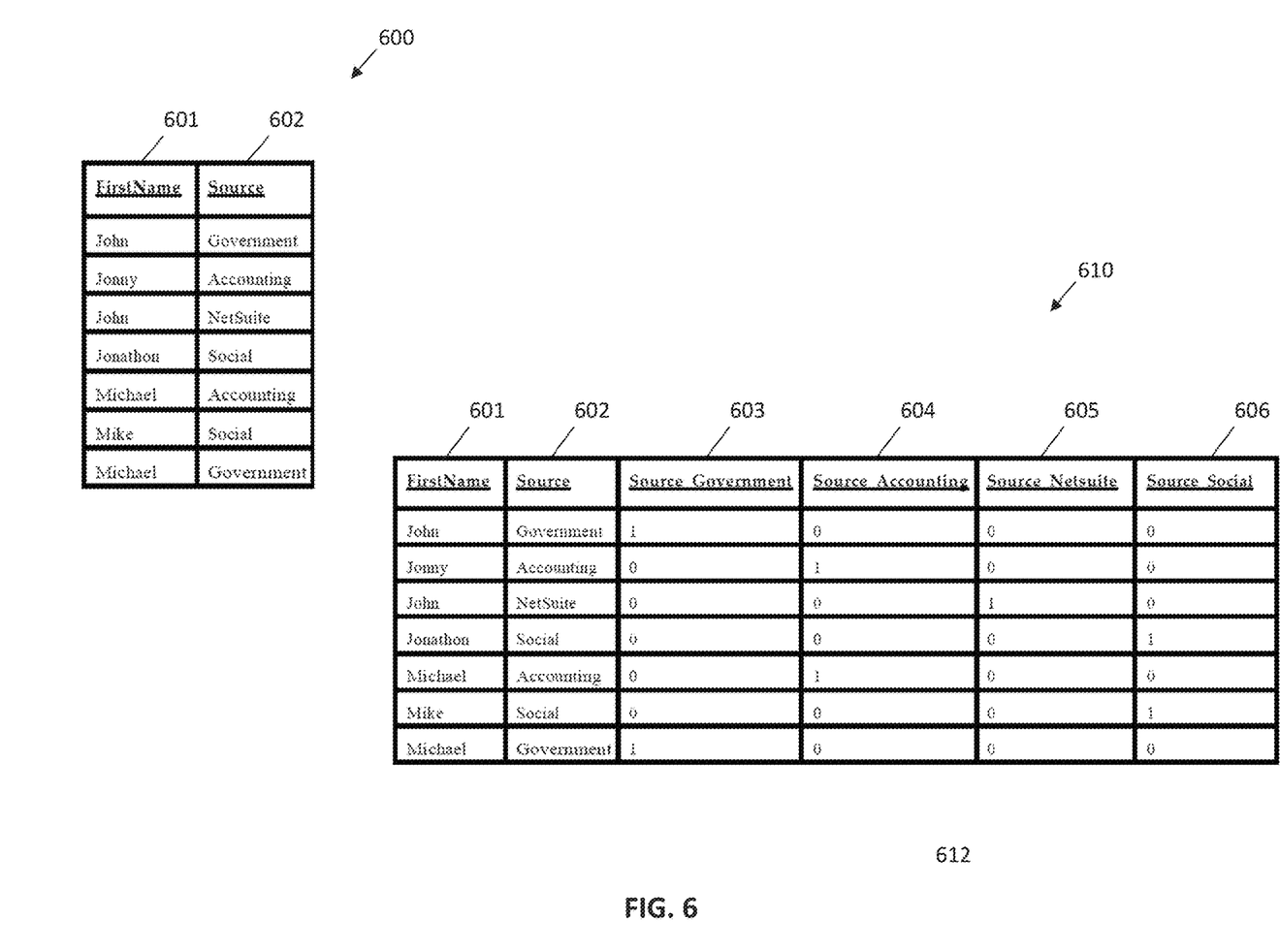
FIG. 6 depicts exemplary tables utilized for building features for categorical values according to an embodiment of the subject matter described herein.

Once a set of feature attributes have been identified as qualifying as categorical, the system can subsequently construct a feature for each of the distinct values as shown in table 600 of FIG. 6. As depicted in FIG. 6, the disclosed system can be configured to identify 'Source' (e.g., see column 602 of table 600 in FIG. 6) as a categorical feature, with cardinality for the above data as '4', i.e., the Government, Accounting, NetSuite, and Social categories. The system is further configured to create a new feature for each of the unique values for such features. For example, the system may convert row values (i.e., row values in column 602) to the columns 603-606 in table 610 via transposition and/or a hot-encoding process. This approach performed by the disclosed system is applicable for rules defined by mathematical operators, such as 'Equals/Not Equals'. Under the umbrella of categorical features, the disclosed system can also process attributes such as 'confidence scores', for which mathematical operators 'Greater-Than/Less-Than' can be used. In such cases, the system may be configured to build categorical features with absolute values.

Returning to FIG. 1, steps 103 and 104 of method 100 entail the construction or building up of the feature attributes used for training the machine learning model. In some embodiments, the disclosed system includes machine learning algorithms that can train on quantifiable features and can process each separate data record on an individual basis. One important and challenging step conducted by the disclosed subject matter involves the extraction of feature attribute values from groups of matched data records and the subsequent utilization of the extracted feature attribute data to train the machine learning models (e.g., the merged machine learning model described below and depicted in FIG. 10).

Specifically, machine learning models or algorithms can train on a set of data records, where each data record is treated as an independent entity. In order to be configured with a data record merging functionality, the disclosed machine learning model system is adapted to construct feature attributes at the collection level. Prior to the disclosed subject matter, there was no way to mark or group data records in a manner that allows a machine or computing platform to identity or recognize that a set of data records belongs to a specific collection and should be considered as a single entity (e.g., a single consolidated data record). However, the disclosed subject matter executes a method or process capable of converting record level feature attributes existing at the record level into collection level feature attributes in the collection level, such that a trained machine learning model can make a prediction for data record groups rather than just individual records (as described further below).

For example, step 103 indicates that the system can extract one or more samples from the entire record dataset. Notably, the extracted samples contain divergent patterns and/or variations that are largely representative of the entire duplicate record data set (as opposed to using all of the potentially millions of individual and/or duplicate data records). For example, once the system has completed with constructing the collection feature attributes on the collection level (e.g., step 102 in FIG. 1), step 103 involves the extraction of one or more samples from the entire dataset, which can then be presented to domain experts for labeling (see below in step 104). As indicated above, the extracted sample(s) encompass and/or represent a majority of patterns and/or variations that are present in the entire collection level feature set. Since the system is attempting to extract diverging collection level group records (i.e., not individual data records), the system is configured to factor and/or consider variation metrics at the collection level, rather than utilizing the absolute values for the features (which will represent divergence at the record level).

Figure 7:
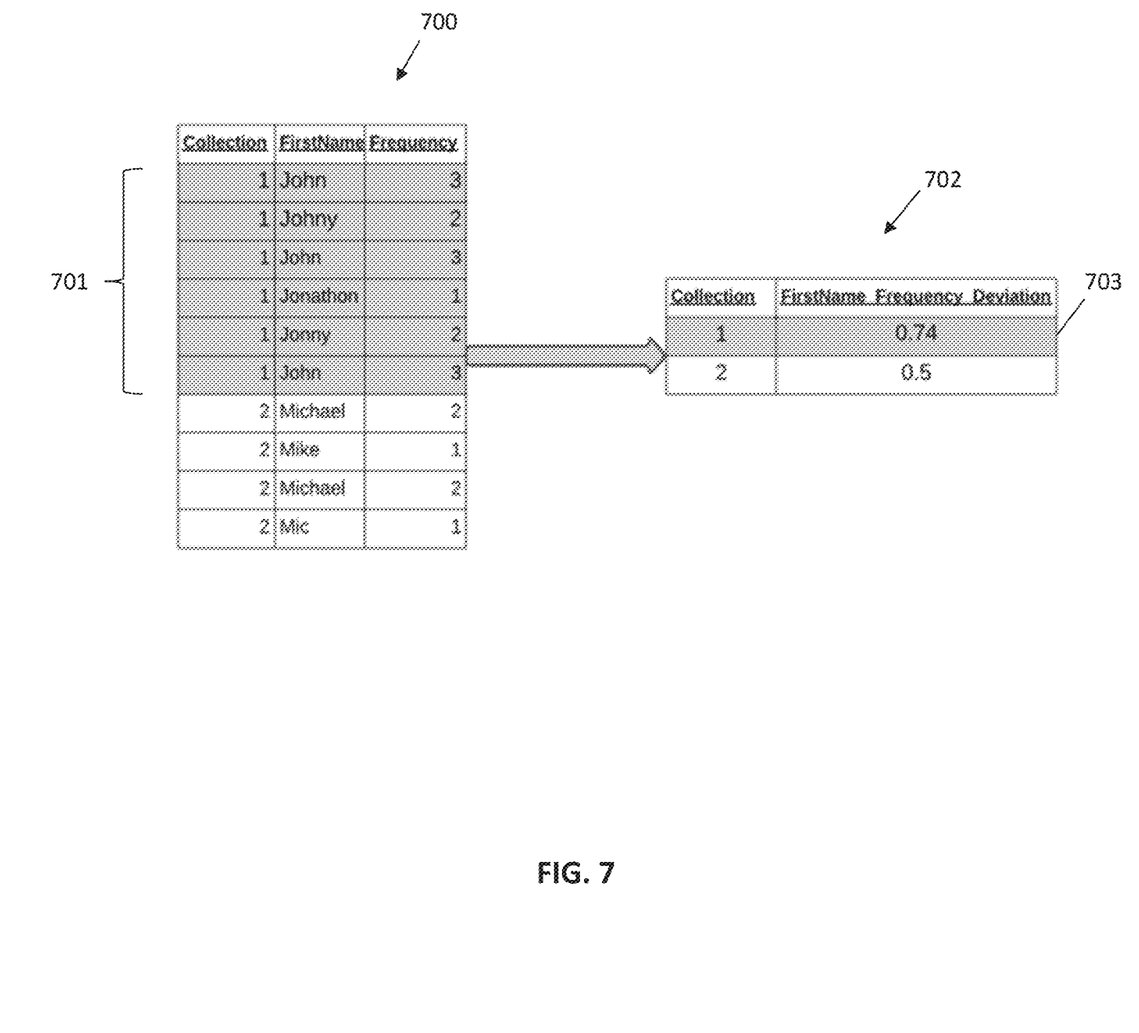
FIG. 7 depicts exemplary tables utilized for extracting variations for labeling according to an embodiment of the subject matter described herein.

In some embodiments, the disclosed system is configured to utilize standard deviation (which serves as a measurement of dispersion and/or spread of the collection level feature attribute values) as a relevant metric for evaluating variations occurring at the collection level. For each feature within a collection group of duplicate data records, the standard deviation represents the divergence of the feature attribute values existing at the collection level, as illustrated in FIG. 7. Notably, FIG. 7 illustrates that that entire collection group 701 in table 700 is reduced or converted into a single record entry 703 that is listed in table 702. In some embodiments, a deviation for each feature attribute at the collection level can be used to extract one or more samples characterized by diverging values, which are then presented to domain experts for the labeling of golden records (i.e., master data records).

Figure 8:
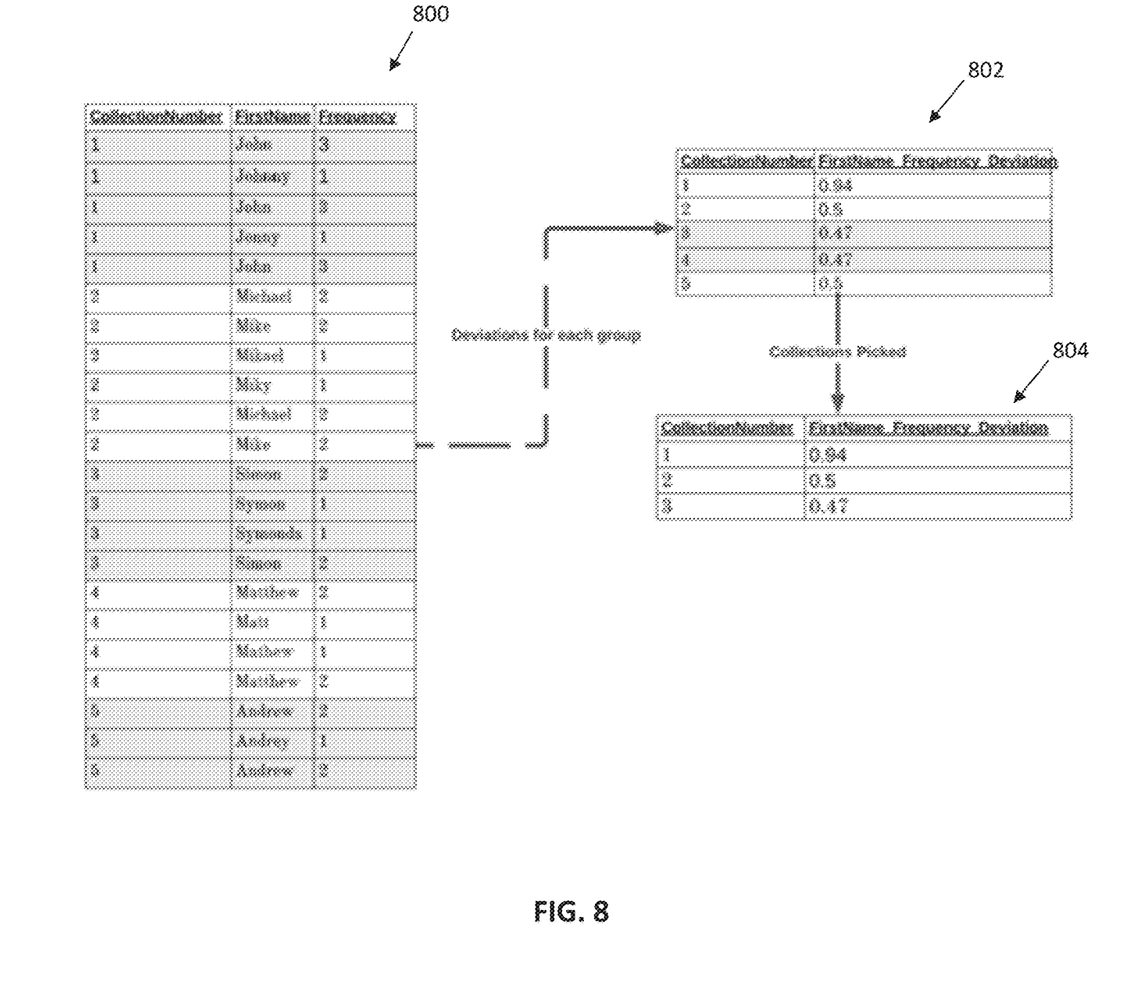
FIG. 8 depicts exemplary tables utilized for selecting collection groups that exhibit novel variations according to an embodiment of the subject matter described herein.

After consolidating duplicate data records at the collection level (e.g., via the use of basic standard deviation), the disclosed system can employ an array of clustering algorithms (e.g., unsupervised learning) to extract a sample of the collection group (as described above in step 103). Notably, the extracted samples are representative of a majority of variations in the source data. As depicted in FIG. 8, the system selects the collection groups which offer more variation or deviation (e.g., while ignoring the collection groups with similar variations, as represented by a deviation score). For example, the record entries that are listed in table 800 at the record level can be processed by the system, which is configured to determine the standard deviations in table 802 for each of the collection groups indicated in table 800. Once the deviations are determined, the system is further configured to select a number of collection groups (e.g., indicated in table 804) that are representative of the entire data record set.

Figure 9:
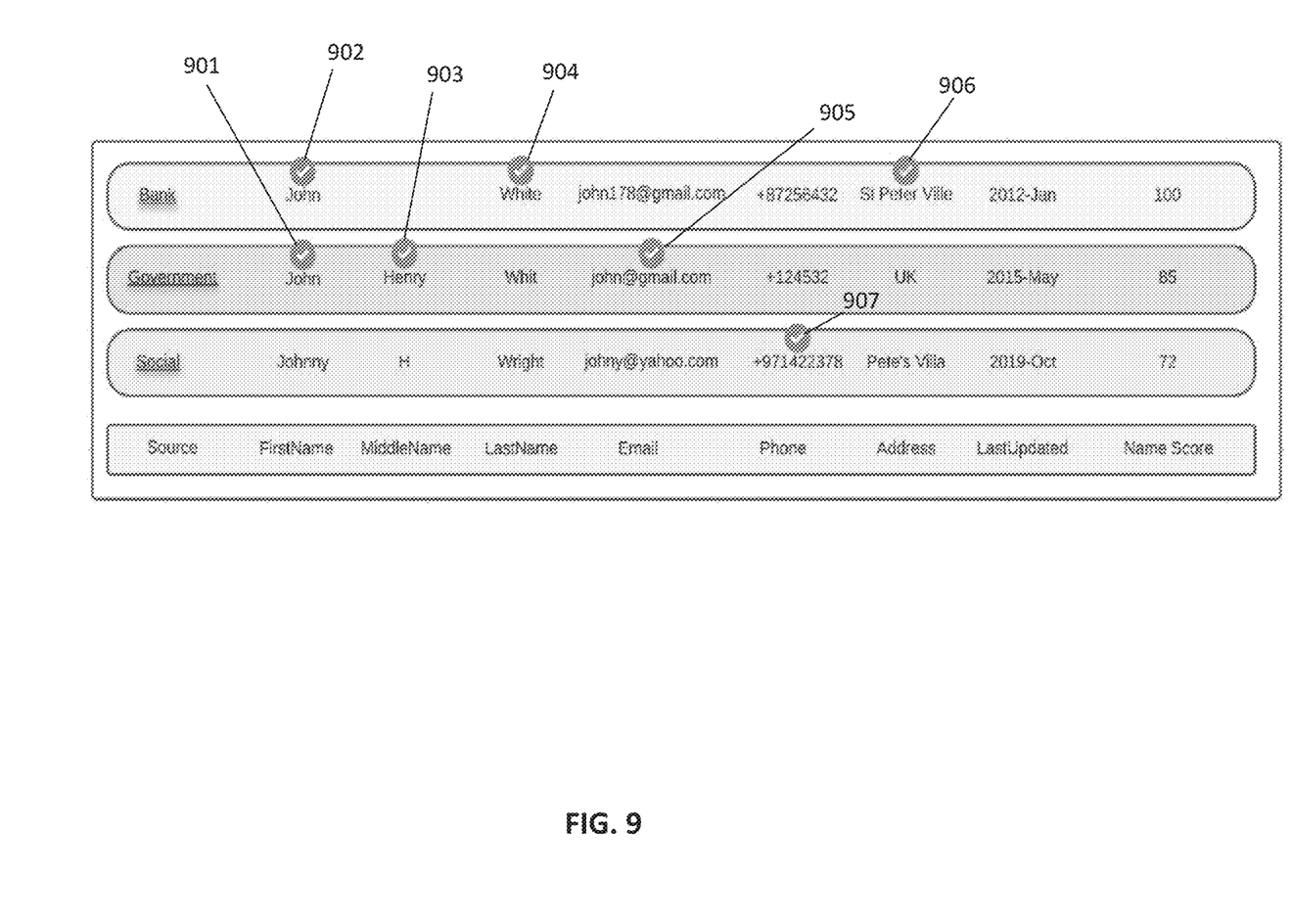
FIG. 9 illustrates an exemplary plurality of records that are labeled by domain experts according to an embodiment of the subject matter described herein.

Returning to FIG. 1, step 104 indicates that the system is configured to receive input and/or stimulus from domain experts. In some embodiments, business domain experts can label the master data records by selecting values at each feature attribute level/category (e.g., Source, First Name, Middle Name, Last Name, Email, Phone, Address, Last Updated, and Name Score). For example, FIG. 9 depicts checkmark indications 901-907, which represent the various labels assigned/tagged to the feature attribute values in the listed record by the business domain experts.

In step 105, feature sets along with output labels for these sample groups are then used to train machine learning models. For example, the sample groups tagged in step 104 can be used as input to train the machine learning model(s).

Method 100 then continues to decision step 106 where a determination is made as to whether the system is configured to utilize a blackbox approach (or a whitebox approach) using a trained merging machine learning (MML) model. If method 100 is configured to use the blackbox approach, then the process proceeds to step 107 where the trained machine learning model utilizes a blackbox approach to output a predicted golden record for the collection groups of duplicate records. If method 100 is not configured to utilize the blackbox approach, method 100 then proceeds to step 108 where one or more output rules are produced. Notably, step 108 indicates that the trained machine learning model produced in step 105 can be used to generate a set of rules that can be applied to the system, which can be configured to use the set of rules to generate a master data record from the groups of duplicate data records.

Figure 10:
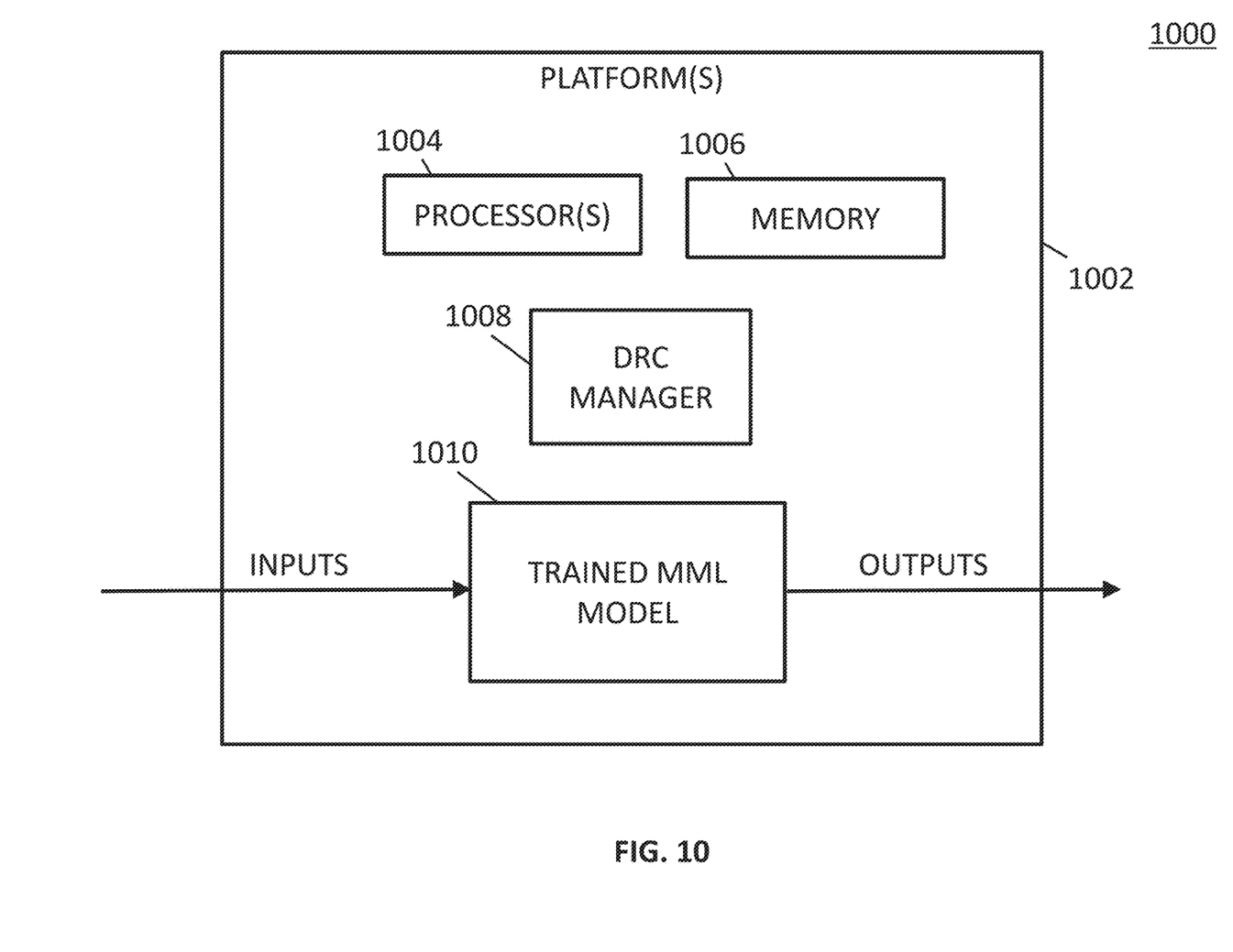
FIG. 10 is a block diagram of an example computing platform configured for utilizing machine learning for merging duplicate records according to an embodiment of the subject matter described herein.

FIG. 10 is a block diagram of an example computer platform system 1000 for utilizing machine learning for merging duplicate data records. In FIG. 10, system 1000 may include one or more computing platform(s) 1002 having one or more processor(s) 1004, such as a central processing unit (e.g., a single core or multiple processing cores), a microprocessor, a microcontroller, a network processor, an application-specific integrated circuit (ASIC), or the like. Computing platform 1002 may also include memory 1006. Memory 1006 may comprise random access memory (RAM), flash memory, a magnetic disk storage drive, and the like. In some embodiments, memory 1006 may be configured to store a data record consolidation (DRC) manager 1008 and a trained merging machine language model (MML) model 1010. More specifically, trained MML model 1010 may reside on memory of computing platform(s) 1002 and be executable by processor(s) 1004. Trained MML model 1010 may be configured to receive domain expert stimulus data as input data and may generate a master data record corresponding to the duplicate data records or a rule to derive the master data record as output. In some embodiments, DRC manager 1008 can be configured to provide the input data to MML model 1010. In some embodiments, DRC manager 1008 is a software algorithm or process that is configured to construct and/or generate MML models (e.g., trained MML model 1010). Likewise, DRC manager 1008 can be configured to manage and/or execute the training of MML models (e.g., trained MML model 1010) in the manner described above.

It will be appreciated that FIG. 10 is for illustrative purposes and that various entities, their locations, and/or their functions may be changed, altered, added, or removed. For example, some entities and/or functions may be combined into a single entity. In another example, an entity and/or function may be located at or implemented by two or more entities.

Figure 11:
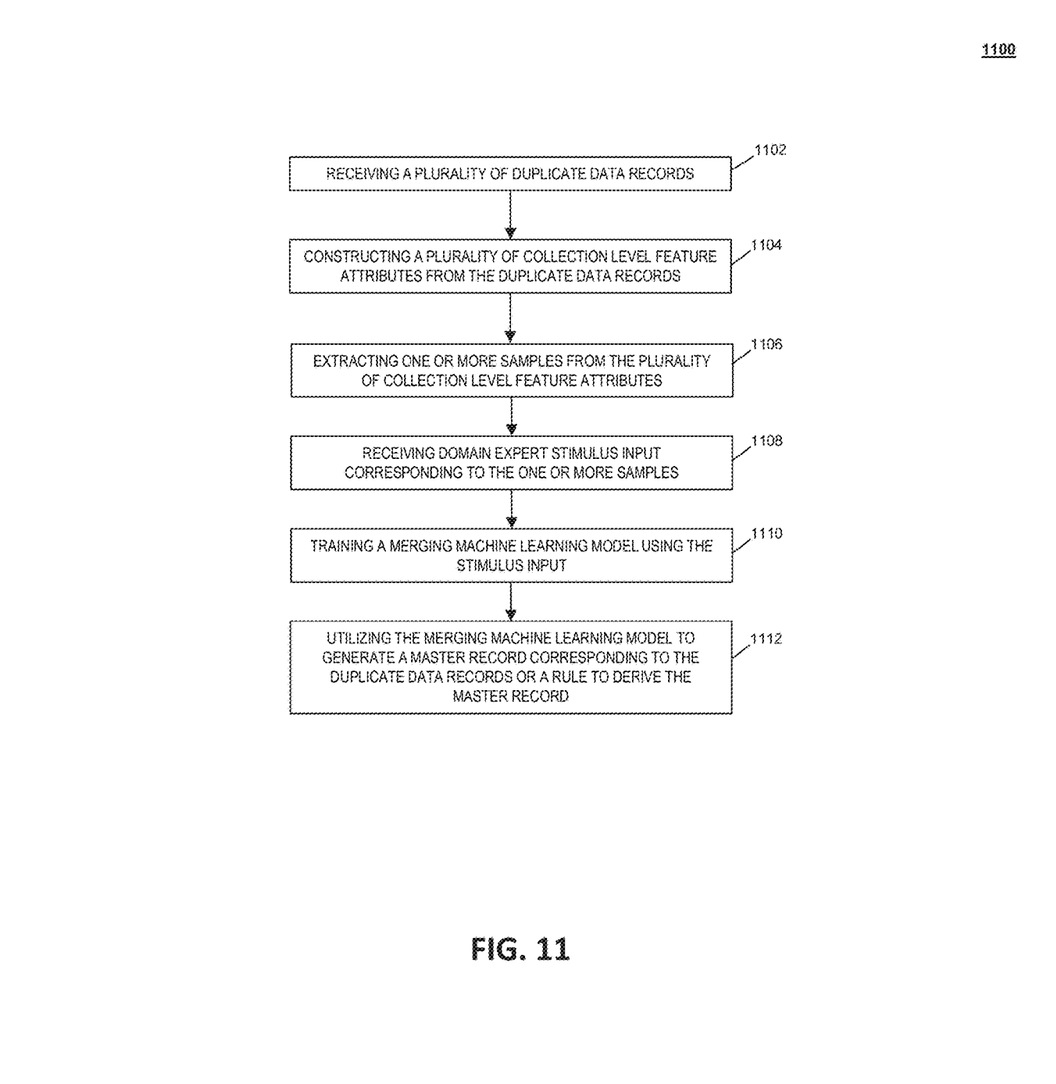
FIG. 11 is a diagram illustrating an example method for utilizing machine learning for merging duplicate records according to an embodiment of the subject matter described herein.

FIG. 11 is a flow chart illustrating an exemplary method for utilizing machine learning for merging duplicate data records. In some embodiments, method 1100 includes an algorithm and/or software process that is stored in memory and subsequently executed by one or more hardware processors of a computing platform. For example, method 1100 can comprise a DRC manager 1008 described above (or a hardware based network element hosting and/or supporting the DRC manager 1008). It will be appreciated that FIG. 11 is for illustrative purposes and that various entities, their locations, and/or their functions may be changed, altered, added, or removed. For example, some entities and/or functions may be combined into a single entity. In another example, an entity and/or function may be located at or implemented by two or more entities.

In step 1102, a plurality of duplicate data records is received. In some embodiments, a DRC manager hosted by a computing platform is configured to receive duplicate data records as input.

In step 1104, a plurality of collection level feature attributes is constructed from the duplicate data records. In some embodiments, the DRC manager is configured to perform the construction by generating record level features for the duplicate data records and subsequently converting the record level features into collection level features.

In step 1106, one or more samples are extracted from the plurality of collection level feature attributes. In some embodiments, the DRC manager is configured to select and/or extract samples representative of divergent patterns exhibited in the collection level feature attributes.

In step 1108, domain expert stimulus input corresponding to the one or more samples is received. In some embodiments, domain expert stimulus input (e.g., labeling designations) is received by the DRC manager.

In step 1110, a merging machine learning model is trained using the stimulus input. In some embodiments, the DRC manager utilizes the domain expert stimulus input to train the merging machine language model.

In step 1112, the merging machine learning model is utilized to generate a master data record corresponding to the duplicate data records or one or more rules to derive the master data record.

The disclosed system and methodology affords a number of technical benefits over traditional approaches. By using the DRC manager, domain experts are only required to analyze and/or tag a small subset of entire source data that covers a majority of representative variations exhibited by the consolidation features (as opposed to analyzing millions of records). As such, the disclosed subject matter notably provides a more efficient and less time consuming technique for merging data records. Moreover, the disclosed subject matter provides advantages pertaining to resiliency and adaptiveness since every change made to the duplicate record groups can be analyzed for extension of any divergence. Moreover, these change to the duplicate record groups are correspondingly added to the set of variations used to train the machine learning model (e.g., the MML model), which can then adapt to the divergence while retaining existing variations. Further, the disclosed MML model(s) can be utilized to attain high levels of accuracy since the models are configured to process a multitude of complex rules that are difficult to create and subsequently maintain.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
    receiving a plurality of duplicate data records;
    constructing a plurality of collection level feature attributes from the duplicate data records, wherein the plurality of collection level feature attributes is associated with a plurality of collection groups consolidated from the duplicate data records;
    evaluating divergent patterns or variations of feature attribute values of the plurality of collection level feature attributes by assigning deviation scores to the collection groups of the duplicate data records, each of the deviation scores representing a number of divergent patterns or variations in the feature attribute values of one of the collection groups;
    extracting one or more samples from the plurality of collection level feature attributes, wherein the one or more samples comprises a representative subset selected from ones of the collection groups having deviation scores above a predetermined threshold;
    receiving domain expert stimulus input corresponding to the one or more samples;
    training a merging machine learning model, using training data comprising the one or more samples and the stimulus input, to combine input duplicate data records from the plurality of duplicate data records to form a master data record or to produce a rule to derive the master data record;
    utilizing the merging machine learning model to generate the master data record corresponding to the duplicate data records or the rule to derive the master data record;
    analyzing variations between the input duplicate data records and the master data record; and
    updating the merging machine learning model using addition training data comprising the variations between the input duplicate data records and the master data record.

2. The method of claim 1 wherein the plurality of duplicate data records is formed by an internal or external data record matching process.

3. The method of claim 1 wherein constructing the plurality of collection level feature attributes includes generating record level features for the plurality of duplicate data records and converting the record level features into collection level features.

4. The method of claim 3 wherein record level feature attributes include one or more of a frequency feature attribute, length feature attribute, chronology feature attribute, source feature attribute, and completeness feature attribute.

5. The method of claim 1 wherein the plurality of collection level feature attributes include at least one or more of most common feature attribute, longest feature attribute, shortest feature attribute, and most recent feature attribute.

6. The method of claim 1 wherein the domain expert stimulus input comprises label designations of feature attributes indicated in the one or more samples.

7. A system comprising:
   at least one processor;
   a memory element;
   a data record consolidation (DRC) manager stored in the memory element and when executed by the at least one processor is configured for receiving a plurality of duplicate data records, constructing a plurality of collection level feature attributes from the duplicate data records, evaluating divergent patterns or variations of feature attribute values of the plurality of collection level feature attributes, extracting one or more samples from the plurality of collection level feature attributes, and receiving domain expert stimulus input corresponding to the one or more samples; and
   a merging machine learning (MML) model stored in the memory element and when executed by the at least one processor is configured for utilizing the merging machine learning model to generate a master data record corresponding to the duplicate data records or a rule to derive the master data record, wherein the merging machine learning model is trained by the DRC manager, using training data comprising the one or more samples and the stimulus input, to combine input duplicate data records from the plurality of duplicate data records to form the master data record or to produce the rule to derive the master data record, and wherein the merging machine learning module is configured to be updated using addition training data comprising variations between the input duplicate data records and the master data record;
   wherein the one or more samples comprises a representative subset selected from the plurality of collection level feature attributes having a majority of the divergent patterns or variations of the feature attribute values;
   wherein the plurality of collection level feature attributes is associated with a plurality of collection groups consolidated from the duplicate data records;
   wherein evaluating divergent patterns or variations of feature attribute values by assigning deviation scores to the collection groups of the duplicate data records, each of the deviation scores representing a number of divergent patterns or variations in the feature attribute values of one of the collection groups; and
   wherein extracting the one or more samples comprises selecting the representative subset from ones of the collection groups having deviation scores above a predetermined threshold.

8. The system of claim 7 wherein the plurality of duplicate data records is formed by an internal or external data record matching process.

9. The system of claim 7 wherein the DRC manager is further configured for generating record level features for the plurality of duplicate data records and converting the record level features into collection level features.

10. The system of claim 9 wherein record level feature attributes include one or more of a frequency feature attribute, length feature attribute, chronology feature attribute, source feature attribute, and completeness feature attribute.

11. The system of claim 7 wherein the plurality of collection level feature attributes include at least one or more of most common feature attribute, longest feature attribute, shortest feature attribute, and most recent feature attribute.

12. The system of claim 7 wherein the domain expert stimulus input comprises label designations of feature attributes indicated in the one or more samples.

13. A non-transitory computer readable medium having stored thereon executable instructions that when executed by at least one processor of a computer cause the computer to perform steps comprising:
   receiving a plurality of duplicate data records;
   constructing a plurality of collection level feature attributes from the duplicate data records, wherein the plurality of collection level feature attributes is associated with a plurality of collection groups consolidated from the duplicate data records;
   evaluating divergent patterns or variations of feature attribute values of the plurality of collection level feature attributes by assigning deviation scores to the collection groups of the duplicate data records, each of the deviation scores representing a number of divergent patterns or variations in the feature attribute values of one of the collection groups;
   extracting one or more samples from the plurality of collection level feature attributes, wherein the one or more samples comprises a representative subset selected from ones of the collection groups having deviation scores above a predetermined threshold;
   receiving domain expert stimulus input corresponding to the one or more samples;
   training a merging machine learning model, using training data comprising the one or more samples and the stimulus input, to combine input duplicate data records from the plurality of duplicate data records to form a master data record or to produce a rule to derive the master data record;
   utilizing the merging machine learning model to generate the master data record corresponding to the duplicate data records or the rule to derive the master data record;
   analyzing variations between the input duplicate data records and the master data record; and
   updating the merging machine learning model using addition training data comprising the variations between the input duplicate data records and the master data record.

14. The non-transitory computer readable medium of claim 13 wherein the plurality of duplicate data records is formed by an internal or external data record matching process.

15. The non-transitory computer readable medium of claim 13 wherein constructing the plurality of collection level feature attributes includes generating record level features for the plurality of duplicate data records and converting the record level features into collection level features.

16. The non-transitory computer readable medium of claim 15 wherein record level feature attributes include one or more of a frequency feature attribute, length feature attribute, chronology feature attribute, source feature attribute, and completeness feature attribute.

17. The non-transitory computer readable medium of claim 13 wherein the plurality of collection level feature attributes include at least one or more of most common feature attribute, longest feature attribute, shortest feature attribute, and most recent feature attribute.

* * * * *